(12) United States Patent
Kalkanoglu et al.

(10) Patent No.: US 9,452,560 B2
(45) Date of Patent: Sep. 27, 2016

(54) MULTILAYER ARTICLE WITH VARIEGATED APPEARANCE

(75) Inventors: Husnu Kalkanoglu, Swarthmore, PA (US); Gregory F. Jacobs, Oreland, PA (US)

(73) Assignee: CERTAINTEED CORPORATION, Malvern, PA (US)

( * ) Notice: Subject to any disclaimer, the term of this patent is extended or adjusted under 35 U.S.C. 154(b) by 587 days.

(21) Appl. No.: 12/521,414

(22) PCT Filed: Feb. 4, 2008

(86) PCT No.: PCT/US2008/052879
§ 371 (c)(1),
(2), (4) Date: Jan. 15, 2010

(87) PCT Pub. No.: WO2008/097880
PCT Pub. Date: Aug. 14, 2008

(65) Prior Publication Data
US 2010/0129622 A1    May 27, 2010

Related U.S. Application Data (60) Provisional application No. 60/887,849, filed on Feb. 2, 2007.

(51) Int. Cl.
*B29C 41/22* (2006.01)
*B29C 47/06* (2006.01)
(Continued)

(52) U.S. Cl.
CPC ......... *B29C 47/0021* (2013.01); *B29C 47/046* (2013.01); *B29C 47/065* (2013.01); *B29C 47/145* (2013.01); *B29C 47/0019* (2013.01); *B29L 2031/10* (2013.01); *Y10T 428/24868* (2015.01)

(58) Field of Classification Search
CPC .................................................... B29C 47/046
USPC ....................................................... 428/195.1
See application file for complete search history.

(56) References Cited

U.S. PATENT DOCUMENTS

| | | |
|---|---|---|
| 2,917,781 A | 12/1959 | Petry |
| 3,663,493 A | 5/1972 | Miller |

(Continued)

FOREIGN PATENT DOCUMENTS

WO  PCT/US2007/085900    2/2009

OTHER PUBLICATIONS

International Search Report dated May 23, 2008 in PCT/US08/52879.

(Continued)

*Primary Examiner* — Ian Rummel
(74) *Attorney, Agent, or Firm* — Abel Law Group, LLP; Alexander H Plache (57) ABSTRACT

A variegated capstock for covering a substrate for a building product has polymeric streaks in a non-clear, non-opaque matrix. Rapid cooling of the matrix minimizes formation of crystallites, such that the polymeric streaks become visible through a surface of the non-opaque matrix. The streaks are visible by having a color or an index of refraction different from that of the matrix. The matrix is in one or more layers, and the polymeric streaks are in the layers. The substrate is visible through the non-clear, non-opaque matrix and can appear partially obscured by the non-clear, non-opaque matrix.

13 Claims, 7 Drawing Sheets

(51) Int. Cl.
  *B32B 27/00* (2006.01)
  *B32B 27/18* (2006.01)
  *B32B 3/10* (2006.01)
  *B29C 47/00* (2006.01)
  *B29C 47/04* (2006.01)
  *B29C 47/14* (2006.01)
  *B29L 31/10* (2006.01)

(56) References Cited

U.S. PATENT DOCUMENTS

| | | |
|---|---|---|
| 4,048,101 A | 9/1977 | Nakamachi et al. |
| 5,232,751 A | 8/1993 | Cameron et al. |
| 5,387,381 A | 2/1995 | Saloom |
| 5,866,054 A | 2/1999 | Dorchester |
| 5,869,176 A | 2/1999 | Dorchester et al. |
| 5,998,006 A | 12/1999 | Bambara et al. |
| 6,187,415 B1* | 2/2001 | Gaa .................. 428/203 |
| 6,692,683 B2 | 2/2004 | Gockel et al. |
| 6,783,348 B2 | 8/2004 | Lee |
| 6,932,591 B2 | 8/2005 | Cramer |
| 7,204,944 B2 | 4/2007 | Piedboeuf |
| 7,462,308 B2 | 12/2008 | Hills |
| 2003/0031832 A1* | 2/2003 | Olson et al. .......... 428/156 |
| 2004/0038002 A1* | 2/2004 | Franco et al. ........ 428/151 |
| 2004/0126571 A1 | 7/2004 | Bordener |
| 2005/0003221 A1 | 1/2005 | Walrath |
| 2005/0131123 A1* | 6/2005 | Hawrylko et al. ...... 524/425 |
| 2005/0285293 A1 | 12/2005 | Brown et al. |
| 2006/0029775 A1 | 2/2006 | MacKinnon et al. |
| 2007/0154689 A1* | 7/2007 | Hughes et al. ........ 428/195.1 |
| 2007/0266562 A1 | 11/2007 | Freedman et al. |

OTHER PUBLICATIONS

U.S. Appl. No. 60/955,051, filed Aug. 10, 2007.

* cited by examiner

MULTILAYER ARTICLE WITH VARIEGATED APPEARANCE

CROSS REFERENCE TO RELATED APPLICATIONS

This application claims the benefit of International PCT Application Number PCT/US08/52879 filed 4 Feb. 2008, which claims the benefit of U.S. Provisional Application No. 60/887,849 Filed Feb. 2, 2007.

FIELD OF THE INVENTION

The present invention relates to manufacture of a capstock having a pattern of streaks that are visible through the surface of the capstock. For example, the capstock is non-opaque and covers a substrate to provide building materials such as, polymeric siding, synthetic roofing shingles, slates, shakes and panels, decking, floor coverings, tiles, fence posts and rails and window frames.

BACKGROUND OF THE INVENTION

U.S. Pat. No. 4,048,101 to Nakamachi discloses the manufacture of opaque articles having a variegated pattern of streaks. The variegated pattern is produced by extruding a foamed polymeric matrix material together with polymeric accent materials having colorant additives, which form accent color streaks in the polymeric matrix material. The polymeric accent materials have a lower melt index and a larger particle size compared to the foamed matrix material, such that its melt flow rate is lower than that of the matrix material. The accent material and the matrix material are resinous compositions of the same chemical type, to assure bonding therebetween.

U.S. Pat. No. 5,387,381 to Saloom discloses a method for making an opaque capstock having a simulated wood-grain appearance for coextrusion with a polyvinylchloride (PVC) substrate. The capstock material combines a polymeric matrix with accent color pellets consisting essentially of acrylics or polycarbonates having a higher deflection temperature and a larger particle size compared to the polymeric matrix. During an extrusion cycle, the polymeric matrix undergoes melt flow, and the accent color pellets undergo melt flow later in the extrusion cycle, which produces accent color streaks in the extruded capstock matrix.

U.S. Pat. No. 5,866,054 to Dorchester discloses an opaque capstock manufactured with a PVC polymer matrix together with accent color pellets comprised of, acrylic resins blended with poly-α-methyl styrene (PMS) resin. The PMS resin in the pellets has a higher vicat softening point temperature and a higher melt flow index relative to the acrylic resins in the same pellets. Varying the proportion of the PMS to the acrylic resins in the pellets results in a corresponding, soft streaking (gradual color change) or hard streaking (abrupt color change) in the polymer matrix.

US 2005/0003221 A1, to Walrath, discloses an optically clear capstock manufactured from a matrix resin of methacrylic acid polymer or other essentially clear, ultraviolet resistant, matrix materials, and streaker pellets of a polymeric material compatible with the methacrylic matrix resin but having a higher melting point. The matrix resin and streaker pellets are fed into an intake end of an extruder screw feed. The screw feed has four temperature stages, such that the transparent matrix material melts and flows before the streaker pellets become melted within the last temperature stage. Then, the melted materials are extruded to form a transparent capstock having accent color streaks in a transparent matrix. Further, the capstock is coextruded with an underlying polymeric substrate that is visible through the transparent capstock. The capstock has a heat deflection temperature and a glass transition temperature similar to that of the coextruded substrate.

Optically clear polymers have been proposed for making a transparent capstock. Optically clear polymers, such as, polycarbonates and polyacrylates, are highly valued for having a refractive index suitable for use in window panes, lenses and optical coatings. However, an optically clear capstock would be unnecessary, when the capstock is sufficiently non-opaque to an extent that streaks in the capstock are visible through the surface of the capstock. The streaks would be visible in three dimensions to provide an aesthetic three dimensional appearance. Further, an optically clear capstock would be unnecessary, when the capstock is not optically clear, i.e. non-clear, and is sufficiently non-opaque to an extent that a color of a substrate under the capstock would be visible through the surface of the capstock, even when the underlying streaks and underlying substrate themselves are visibly indistinct as the result of being partially obscured by the non-clear, non-opaque capstock.

US 2006/0029775 A1 and 2007/0266562 A1 disclose a capstock or skin material that may be extruded though an extruder, while a core material is coextruded through another extruder. The extrudate is a preliminary shingle shape, a precursor that is compression molded into a final shingle shape as disclosed by US 2006/0029775 A1, U.S. 60/955,051 and PCT/US07/85900, WO2009/0023038, U.S. Ser. No. 11/994,445.

SUMMARY OF THE INVENTION

A method of making a variegated capstock includes, melting matrix particles comprised of a polymer or a polymers mixture having a non-clear, non-opaque phase, melting pellets of streaker constituents to form melt phase streaker constituents in the melted matrix material, melt forming the matrix to form a non-clear, non-opaque matrix, and melt forming the streaker constituents to form streaks visible through a surface of the non-clear, non-opaque matrix; and rapidly cooling the matrix and the streaks to minimize formation of an opaque phase. Advantageously, less expensive, non-opaque polymers that are not optically clear are used for making a non-opaque capstock, in place of optically clear polymers proposed for making a clear capstock. An embodiment of the invention includes the variegated capstock combined with a substrate of a core material to provide a building product. Embodiments of the building product include, but are not limited to polymeric siding, synthetic roofing shingles, slates, shakes and panels, decking, floor coverings, tiles, fence posts and rails and window frames.

A capstock of the invention has one or a plurality of variegated layers comprised of respective streaks in a non-clear, non-opaque matrix. In an embodiment of the invention, the capstock is adapted to cover a substrate of a core material. The capstock and the substrate are formed into an article of manufacture, for example, a building product. According to further embodiments of the invention, the capstock and substrate are formed by compression molding as disclosed by US 2006/0029775 A1 or casting or molding in situ followed by rapid cooling to provide an article of manufacture, for example, a building product including, but not limited to; polymeric siding, roofing shingles, slates, shakes and panels, decking, floor coverings, tiles, fence posts and rails and window frames.

DETAILED DESCRIPTION OF THE INVENTION

Figure 1A:
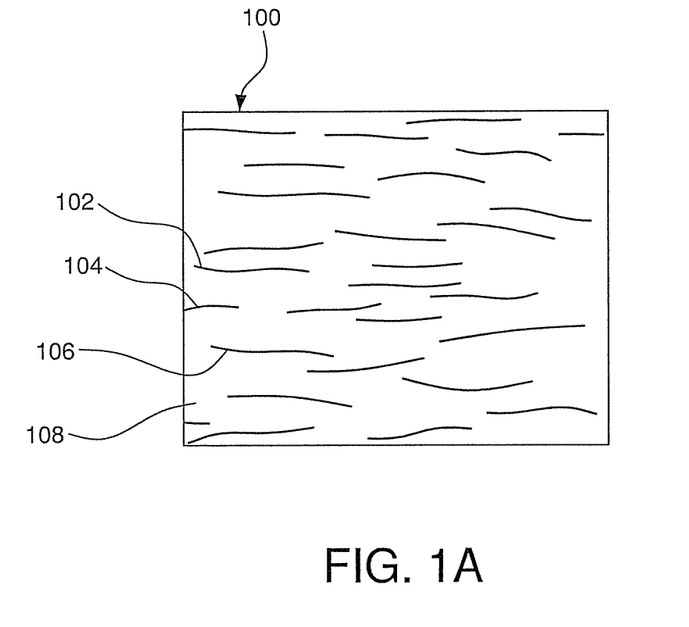
FIG. 1A is a top view of an exemplary capstock.

FIG. 1a is a top view of a non-opaque and non-clear capstock 100 having exemplary streaks 102, 104, 106 in a non-opaque and non-clear matrix 108. The streaks 102, 104, 106 are produced by the streaker particles 700 disclosed in FIG. 7, which particles 700 are melt formed during processing in the apparatus 600, FIG. 6, to extend and spread within the non-opaque matrix 108. The non-opaque matrix 108 is produced by the matrix particles 702, FIG. 7, that are melt formed during processing in the apparatus 600, FIG. 6. Optionally, some of the streaks 102, 104, 106 can be close to the surface or form part of the surface such that they affect tactile surface texture of the capstock 100.

Figure 1B:
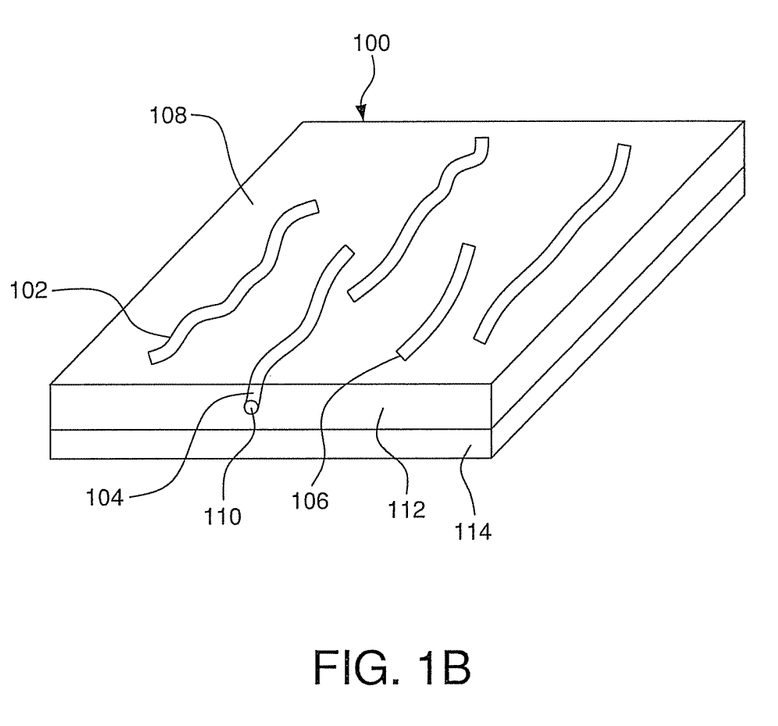
FIG. 1B is an isometric view of the exemplary capstock disclosed by FIG. 1.
Figure 1C:
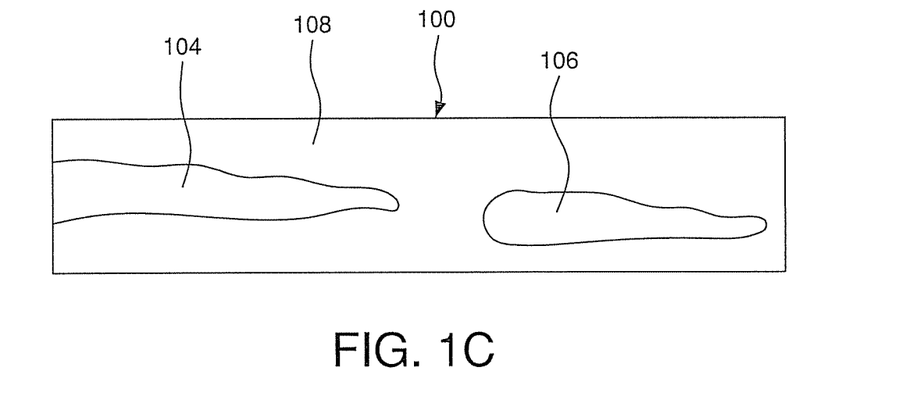
FIG. 1C is an edge view of the exemplary capstock disclosed by FIG. 1.

FIG. 1B discloses the exemplary streak 104 extending to an edge 110 thereof coincident with an edge 112 of the non-opaque capstock 100. The capstock 100 can exist as a separate part. Additionally, the capstock can exist in combination with an exemplary substrate 114 to comprise articles of manufacture, including, but not limited to polymeric siding, synthetic roofing shingles, slates, shakes and panels, decking, floor coverings, tiles, fence posts and rails and window frames. The substrate 114 is covered by the non-opaque capstock 100, for example, to provide an aesthetic appearance, a weather protective coating, and to simulate a wood grain or mineral veining FIGS. 1A and 1B disclose that the streaks 102, 104, 106, are located within the layer thickness of the matrix 108.

The streaks 102, 104, 106 are visible through the surface of the non-opaque capstock 100, when the streaks have a different index of refraction than that of the non-opaque matrix 108, or are more opaque than the matrix 108, or have a contrast color compared to the color, or lack of color, in the non-opaque matrix 108. A colorant added to the matrix 108 is permitted, which produces a hue that itself is non-opaque.

According to the present invention, a capstock 100 has a matrix 108 that is non-opaque to an extent that different streaks 102, 104, 106 extending in the matrix thickness are visible through the surface of the non-opaque matrix 108 of the non-opaque capstock 100. Thereby, the streaks 102, 104, 106 are visible in three dimensions. Different sizes of streaker pellets 700 will result in different widths or shapes of streaks 102, 104, 106. The entire thickness or depth of the capstock 100 encompasses about 1-40 mil, and preferably 3-30 mil, and more preferably 5 mil to 25 mil for a single or multiple layer capstock. In a multilayer capstock, FIGS. 3 and 4, there are individual layers that vary from 1-25 mil thickness to provide latitude in controlling the manufacture of a multilayer capstock. The matrix 108 of the capstock 100 can be visually non-opaque to a depth less than its total thickness to view the streaks 102, 104, 106 extending below the surface of the capstock 100. Thereby, a three dimensional appearance of the streaks 102, 104, 106 is obtained, even when the depth of the matrix 108 is visually obscure or indistinct beyond such a limited depth, by being blurred, faintly seen, partially covered, partially camouflaged, or optically distorted by a lens effect of the non-opaque matrix 108 of the capstock 100. Alternatively, the matrix 108 can be visually non-opaque entirely through its entire depth or thickness to view the color of an underlying substrate 114, even if the substrate 114 itself is visually obscure or indistinct when viewed through the surface of the capstock 100.

According to a further embodiment of the invention, wherein the non-opaque capstock 100 covers an underlying substrate 114, it can be advantageous that the color of the underlying substrate 114 is visible through the surface of the non-opaque capstock 100, even when the streaks and underlying substrate 114 itself are visually obscure or indistinct when viewed through the surface of the capstock 100. Further, the streaks 102, 104, 106 in the matrix 108 can provide a contrast color or a matched color, compared to the color of the underlying substrate 114.

Figure 2:
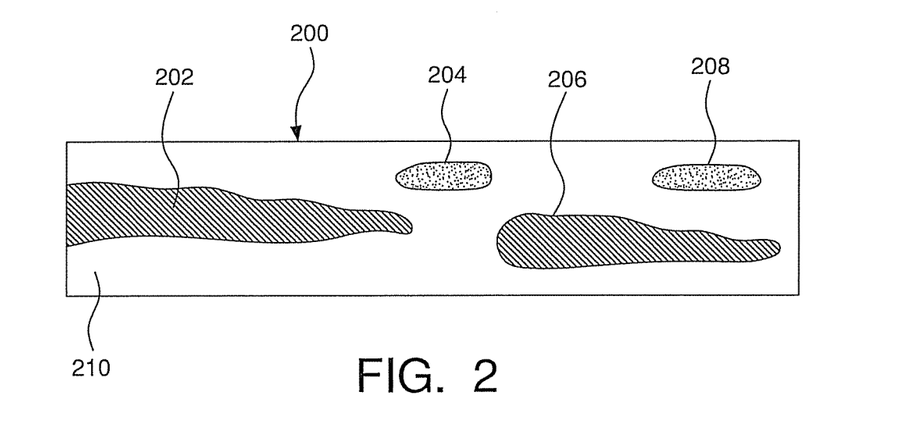
FIG. 2 is an edge view of a variation of the capstock disclosed by FIG. 1.
Figure 7:
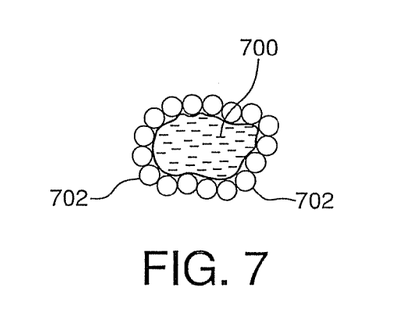
FIG. 7 is a schematic view of a streaker pellet and particles of matrix materials.

FIG. 2 discloses a variation of the capstock 100, wherein a non-opaque capstock 200 has different types of streaks 202, 204, 206, 208 that can include, e.g., color, size and melt rheology, in the same non-opaque matrix 210. Different sizes of streaker pellets 700 will result in different widths or shapes of streaks 202, 204, 206, 208. Different melt rheology, or melt index, or viscosity, during processing, will yield different behaviors in streak flow. For example, at higher melt index, i.e. lower viscosity, streaker pellets 700 will stretch out more on processing. Larger pellets 700 may produce wider streaks of variegation. Streaker pellets 700 with greater miscibility/compatibility with the matrix polymer will produce streaks 202, 204, 206, 208 having more diffuse boundaries.

Figure 3:
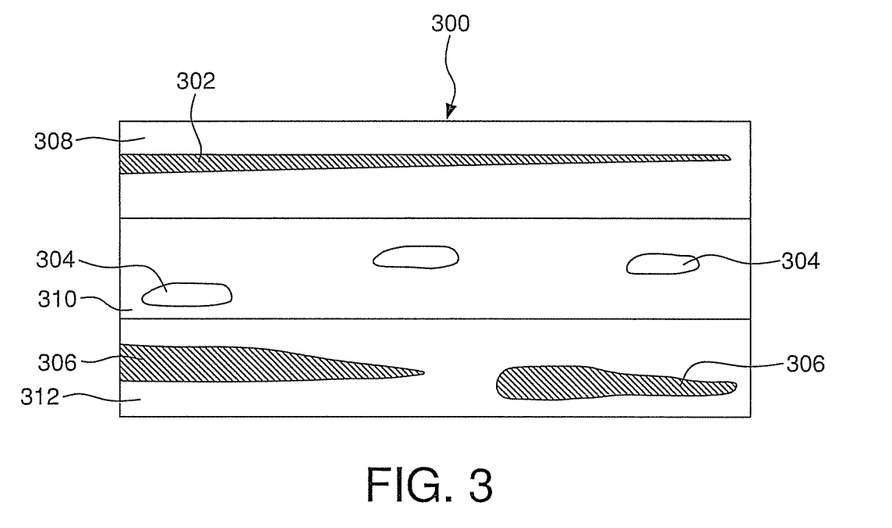
FIG. 3 is an edge view of a multilayer capstock, a variation of the capstock disclosed by FIG. 1.

FIG. 3 discloses another variation of the capstock 100, wherein a non-opaque capstock 300 has a plurality of variegated layers comprised of respective streaks 302, 304, 306 in respective matrices 308, 310, 312. The top layer, matrix 308, is substantially transparent, when underlying layers of non-opaque matrices 310, 312 have streaks therein to be seen by viewing through the top layer. The respective streaks 302, 304, 306 are of different types. As noted above, various types of streaker pellets can vary as to, e.g., color, size and melt rheology. Different sizes will result in different widths or shapes of color streaks. Different melt rheology, or viscosity during processing, will yield different behaviors in streak flow. For example, lower viscosity, melted streaker pellets 700 will stretch out more on processing. Larger pellets 700 may produce wider streaks of variegation. Streaker pellets 700 with greater miscibility and/or compatibility with the matrix polymer materials will produce streaks 302, 304, 306 having more diffuse boundaries.

In the embodiment disclosed by FIG. 3, the materials making up the various matrices 308, 310, 312 can be the same or different. The layers can be selected for controlling other functionality required in the end product. The rheology of each non-opaque matrix 308, 310 and 312 can be balanced for the given streaker pellets 700 contained therein. Each layer can also provide other functionality such as, for example, stabilization and UV protection in the outer layers, chemical resistance, or resistance to dirt pickup. Also, while FIG. 3 shows a single type of streaker pellet 700 in each non-opaque matrix 308, 310, 312, a given layer could have more than one type of streaker pellet 700.

A given non-opaque matrix 108, 210, 308, 310, 312 may also include a non-opaque colorant. This non-opaque colorant could be a dye or a small particle pigment. The use of non-opaque color of a layer containing a non-opaque colorant can provide a degree of freedom in imparting a desirable depth in appearance to the article.

Figure 4:
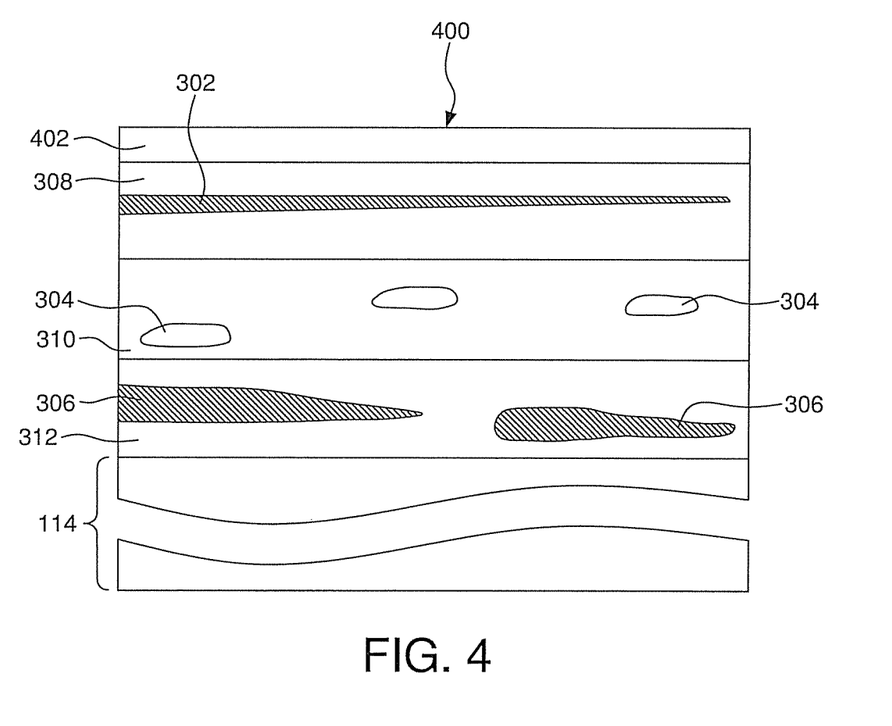
FIG. 4 is an edge view of a further multilayer capstock, a variation of the capstock disclosed by FIG. 1.

FIG. 4 discloses another variation of the capstock 100, wherein a non-opaque capstock 400 has a plurality of variegated layers comprised of respective streaks 302, 304, 306 in respective matrices 308, 310, 312, as disclosed by FIG. 3. Further, FIG. 4 discloses a weather protective overlayer 402 and an exemplary substrate 114 of a core material covered by the capstock 400. The capstock 400 and the exemplary substrate 114 are formed by coextrusion followed by, compression molding as disclosed by US 2006/0029775 A1 or by casting or molding in situ, followed by rapid cooling to provide articles of manufacture, for example, a building material including, but not limited to; polymeric siding, roofing shingles, slates, shakes and panels, decking, floor coverings, tiles, fence posts and rails and window frames. The overlayer 402 can be stabilized for UV and weather protection, and could also have a colorant to contribute further to the overall appearance. Further, the overlayer 402 is substantially transparent and without streaks therein to view the matrices 308, 310, 312 by viewing through the overlayer 402.

Figure 5:
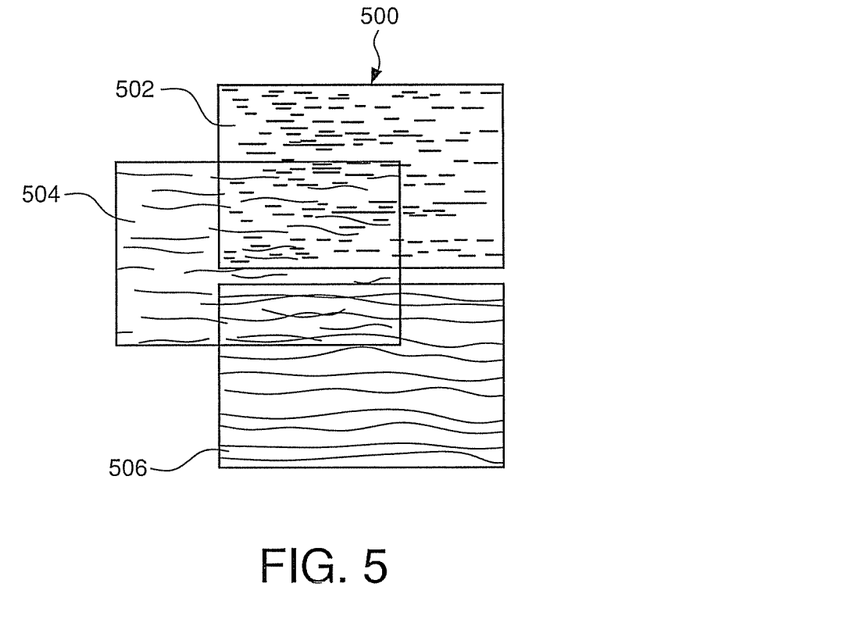
FIG. 5 is a schematic view of another multilayer capstock, a variation of the capstock disclosed by FIG. 1 in which the capstock has multiple capstock layers that can be superposed.

FIG. 5 discloses a capstock 500 that is a variation of the capstock 100. The capstock 500 has three different variegated layers having respective streaks 502, 504, 506 in respective non-opaque matrices. The variegations for each layer are different. For example, a top layer has relatively short color streaks 502, an intermediate layer has streaks 506 of intermediate length, and a bottom layer has relatively long color streaks 504. Also, in an alternate embodiment the short streaks 502 are widest (thickest). The intermediate length streaks 506 are lighter in color than those in the other two layers. These different kinds of variegation can be accomplished by variations in either the matrix or color particle material selection (i.e., relative viscosities, colorants, etc.) When the three variegated layers are fully overlaid, they produce a three-dimensional wood grain simulation or a three-dimensional mineral veining simulation.

Figure 5A:
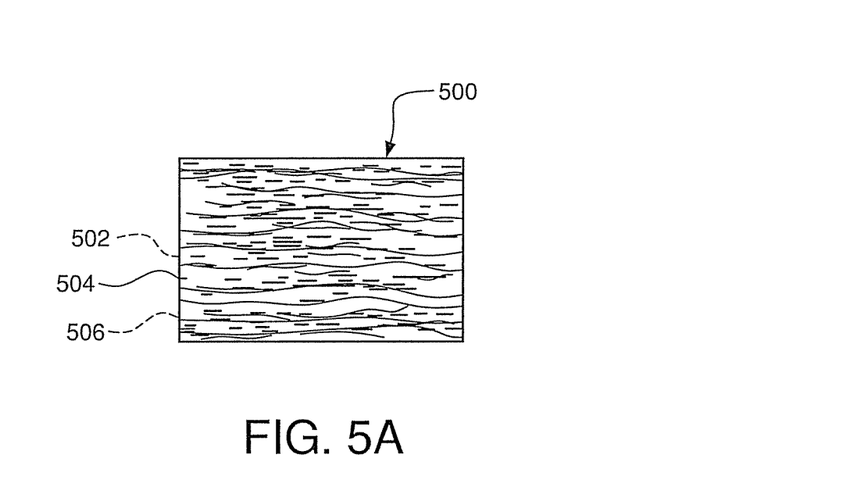
FIG. 5A is a schematic view of the multiple capstock layers disclosed by FIG. 5 superposed to provide a multilayer capstock.

FIG. 5A discloses a capstock 500 that is a variation of the capstock 100, and has three superposed, different variegated layers having respective streaks 502, 504, 506 in respective non-opaque matrices.

Figure 6:
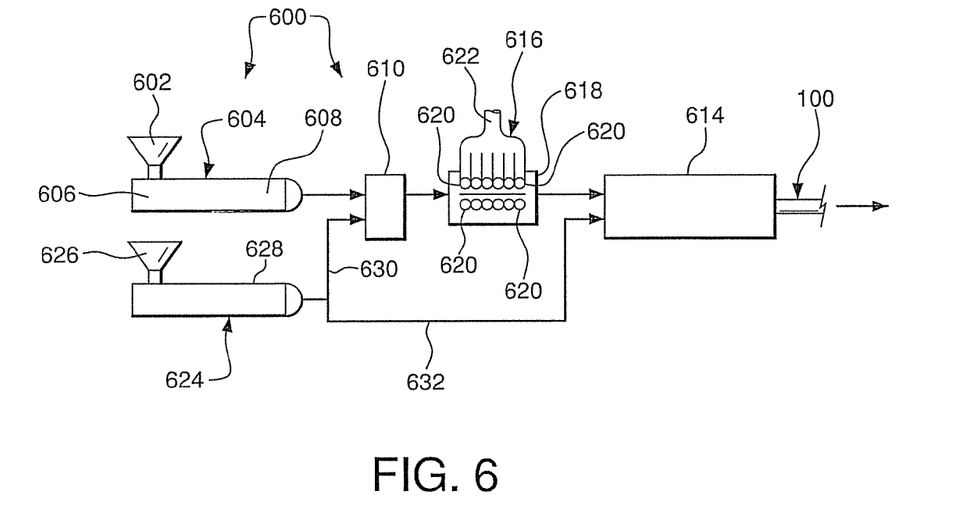
FIG. 6 is a schematic view of an apparatus for manufacturing a capstock.

FIG. 6 is a schematic view of an apparatus 600 for producing a exemplary capstock 100 and variations thereof. The exemplary capstock 100, and variations thereof, are representative of any of the previously described capstocks 100, 200, 300, 400 500. The apparatus 600 has a hopper 602 for supplying polymeric streaker pellets 700, FIG. 7, to a screw feed section 604 of the apparatus 600. The screw feed section 604 comprises a single screw, or multiple screws. Further, matrix particles 702, FIG. 7, are supplied to the hopper 602. The matrix material is a combination of one or more resinous polymeric materials. The streaker pellets 700 are fabricated of multiple particles of constituent materials that are agglomerated together, thereby to form the streaker pellets 700. When discrete streaker pellets 700 are dispersed among discrete matrix particles 702, the streaker pellets 700 could agglomerate with one another, and could migrate among the discrete matrix particles 702, particularly while being impelled in the screw feed section 604. The streaker pellets 700 need to be dispersed throughout the matrix particles 702 to produce an exemplary distribution of streaks 102, 104, 106, FIG. 1A, in the non-opaque matrix 108.

FIG. 7 discloses an embodiment of the invention, wherein small particles 702 of the matrix materials adhere to and cover each streaker pellet 700. The matrix covered streaker pellets 700 are then combined with discrete particles 702 of the matrix materials which are unattached to one another, and which are unattached to the pellets 700, to obtain a desired ratio of streaker pellets 700 to matrix materials. The matrix covered streaker pellets 700 and the discrete particles 702 of matrix materials are mixed and melted in the screw feed section 604.

The temperature at which a measurable melting of a thermoplastic occurs is preferably measured by the vicat method and is referred to as the vicat softening point temperature (Tm). The vicat softening point temperature indicates the temperature at which the resin begins to melt as the temperature of the resin rises. The vicat method and scale, preferred according to the present invention, is specified by ASTM D-1525, from which the "vicat softening point temperature" referenced herein was obtained. There are other scales of temperature based on changes in physical properties of thermoplastics, such as, the deflection temperature and the glass transition temperature (Tg).

The melt flow index or melt index (MI) is a measure of the viscosity of a resin that is fully melted. Complete melting will occur at a temperature above the vicat softening point temperature. A higher melt index corresponds to a lower viscosity. The MI can be determined by ASTM D-1238 Condition E (190° C./2.16 kg). For instance, the MI of polyolefins is generally between about 0.2 dg/min and about 100 dg/min, preferably, between about 1 dg/min and about 10 dg/min, and most preferably between about 2 dg/min and about 8 dg/min. The melt index of the polymer resins can be measured using ASTM D-1238. The melt index of the streaker particles is higher than that of the particles of matrix.

The glass transition temperature (Tg) is a temperature in a temperature range at which an amorphous thermoplastic resin solidifies from a melt phase. For a semi crystalline polymer or crystalline polymer, crystallites form at a crystallization temperature (Tc) as the polymer solidifies from a melt phase. Crystallites forming in the matrix can have a different index of refraction than non-crystalline portions of the matrix. The crystallites contribute to scattering of incident light, which contributes to opacity of the matrix. The matrix becomes solidified with an opaqueness that ranges from a hazy obscure opaqueness to complete opaqueness. According to the invention, minimizing or inhibiting the formation of crystallites is accomplished by rapid cooling of the matrix in its melt phase, resulting in a minimized formation of crystallites, such that the matrix forms into a non-clear, non-opaque matrix having a minimized opacity, enabling the streaks to be visible through the non-clear, non-opaque matrix. The coloration of the substrate is visible through the non-clear, non-opaque matrix, even while the surface topography of the substrate is partially obscured by partial opaqueness of the matrix.

Discrete streaker pellets 700 are mixed with discrete particles 702 of matrix materials. The discrete particles 702 of matrix materials are melted in the screw feed section 604 at or above a first vicat softening point temperature, followed by delayed melting of the discrete streaker pellets 700 at or above a higher vicat softening point temperature. To prevent premature melting of the streaker pellets 700, the higher vicat softening point temperature of the streaker pellets 700 needed to be substantially higher than the vicat softening point temperature of the matrix particles 702. Further, different temperature zones of the screw feed section 604 were under stringent temperature controls, and were spaced widely apart along the length of the screw feed section 604, to prevent premature melting of the streaker pellets 700, before complete melting of the matrix materials of the matrix particles 702.

According to an embodiment of the present invention, the particles 702 of matrix materials coating the exterior of the streaker pellets 700 will melt prior to melting of the coated streaker pellets 700, which minimizes premature melting of the streaker pellets 700 relative to the particles 702 of matrix materials thereon. Further, a lower temperature ratio of the first and second vicat softening point temperatures is permitted. Further, the need for stringent temperature control is reduced. Further, the length of the screw feed section 604 needed for separating the two temperatures is reduced.

In FIG. 6, the screw feed section 604 mixes and combines the matrix coated streaker pellets 700 with additional matrix particles 702. The screw feed section 604 has a first portion 606 that is heated to a first temperature, below the melting temperature of the streaker pellets 700, such that, the particles 702 of matrix materials that coat the streaker pellets 700, will melt at a first vicat softening point temperature to envelop the streaker pellets 700 with melted matrix 702. The streaker pellets 700 melt at a higher vicat softening point temperature. Accordingly, the screw feed section 604 has a second portion 608 that is heated to a second temperature to melt the streaker pellets 700. The streaker pellets 700 have a lower melt index and a lower melt flow rate than that of the particles 702 of matrix materials.

Then the melted streaker materials and the melted matrix particles 702 are melt formed, for example, by extrusion in an extrusion die 610, to provide a shaped exemplary capstock 100. Other melt forming processes include, but are not limited to; vacuum molding, injection molding, and coextrusion of the capstock with a substrate core material, followed by compression molding of the capstock and core material as disclosed in US2006/0029775 A1, or casting or molding in situ followed by rapid cooling. The melt phase matrix 702 and melt phase streaker materials are melt formed, for example, by passage through the extrusion die 610, under heat and pressure, to form an extrudate of an exemplary capstock 100. Subsequently, the extrudate of the exemplary capstock 100 passes through a post-forming section 614 of the apparatus 600 to be formed with a final shape for the capstock 100. For example, a post-forming section is disclosed in U.S. Pat. No. 5,866,054, which may include a cooling section performing cooling of the capstock 100 subsequent to forming the capstock 100 with a final shape.

According to an embodiment of the invention, the exemplary matrix 108 comprises, a polymer or a polymers mixture having a non-opaque phase in its melt form, and an opaque phase in its solid form, and the non-opaque phase is suspended in a substantial portion of the matrix 108 by rapid cooling of the non-opaque phase. According to an embodiment of the apparatus 600, the heat formed exemplary capstock 100 is rapidly cooled by passage through a rapid cooling section 616 of the apparatus 600 after being melt formed in the extrusion die 610. The cooling section 616 comprises a heat exchanger 618 having multiple tubular conduits 620 fed by a manifold 622 for circulation of a cooling fluid, such as, chilled water air, or a refrigerant, thereby removing heat from the heat formed exemplary capstock 100, as the exemplary capstock 100 passes by, in close proximity to, the conduits 620 of the heat exchanger 618. A non-opaque phase of the polymer or polymers mixture of the exemplary capstock 100 is rapidly cooled in a temperature range that falls between its vicat softening point temperature (Tm) and its glass transition temperatures (Tg). More particularly, the rapid cooling causes temperatures to fall substantially below its vicat softening point temperatures (Tm), which suspends the non-opaque phase in a substantial portion of the melt formed matrix 108. Alternatively, such rapid cooling can include rapid cooling to a temperature below any glass transition temperature (Tg) and any crystallization temperature (Tc).

In FIG. 6, the cooling section 616 is located before the post-forming section 614, such that, the suspended non-opaque phase of the matrix 108 is shape formed in the post-forming section 614. Alternatively the cooling section 616 can be located after the post-forming section 614, such that, the non-opaque phase of the matrix 108 is shape formed in the post-forming section 614 prior to being rapidly cooled. The exemplary capstock 100 can be shaped formed in the post-forming section 614 at higher temperatures that are proximate to the vicat softening point temperature (Tm) thereof. The capstock materials pass through the post-forming section 614 at a high velocity, such that, the capstock materials briefly reside at the higher temperatures, before being rapidly cooled by passage through the cooling section 616. Accordingly, the formation of an opaque phase is minimized during the brief time period in which the capstock materials are shape formed in the post-forming section 614 prior to being rapidly cooled in the cooling section 616. The rapid cooling suspends the non-opaque phase in a substantial portion of the capstock 100.

The apparatus 600 has been described for manufacturing one layer of the exemplary capstock 100. According to another embodiment of the invention, the apparatus 600 has another apparatus section 624, FIG. 6, that has a second hopper 626 to receive additional streaker pellets 700 and matrix particles 702. The hopper 626 supplies the pellets 700 and matrix particles 702 to a bottom screw feed section 628 that is similar in structure and operation as the screw feed section 604, which becomes a top screw feed section 604. Further, the bottom screw feed section 628 supplies the melted materials of the pellets 700 and matrix particles 702 to the exemplary extruder die 610, as indicated schematically by a feed line 630. The extruder die 610 is configured as a coextrusion die to coextrude an additional, bottom layer of an exemplary capstock 100, together with the exemplary capstock 100 to provide an exemplary capstock having two layers. Similarly, each of the intermediate layers 310, FIGS. 3 and 4, can be produced, by adding a corresponding intermediate screw feed section, not shown, between the bottom screw feed section 628 and the screw feed section 604, which becomes a top screw feed section 604. The intermediate screw feed section is similar in structure and operation as the screw feed section 604. In addition, the top screw feed section 604 can be used without adding streaker pellets 700 to the hopper 602 to produce the exemplary overlayer 402. The capstock materials include lower cost polymers, such as, polyvinylchloride, polyethylene, polypropylene, AES, ASA, copolymers thereof and mixtures thereof. The capstock material can include fillers, such as, calcium carbonate, talc and silica, but are present in low weight percentages to have minimized contributions to light scattering and opacity. Pigment such as titanium dioxide can also be used in a wt. % that is sufficiently low that the capstock is not rendered opaque.

Alternatively, the apparatus section 624, FIG. 6, can manufacture an exemplary substrate 114, and variations thereof. Polymeric materials of the substrate 114 are fed into the second hopper 626, and are mixed and melted in the second screw feed section 628. The melted materials of the substrate 114 are then supplied to the exemplary extrusion die 610 for coextrusion with the exemplary capstock 100. Subsequent to coextrusion, the capstock 100 and substrate 114 bypass the heat exchanger 618 of FIG. 6, and are formed into an article of manufacture by an embodiment of the post forming section 614. For example, the capstock 100 and the exemplary substrate 114 are coextruded and bypass the heat exchanger 618 to be formed by the post forming section 614 performing compression molding as disclosed by US 2006/0029775 A1 or casting or molding in situ, and followed by rapid cooling to provide a product, an article of manufacture, including, but not limited to; polymeric siding, roofing shingles, slates, shakes and panels, decking, floor coverings, tiles, fence posts and rails and window frames. Further, for example, coextrusion of the capstock 100 and substrate 114, followed by formation in the post forming section 614 and rapid cooling is suitable for making an article of manufacture, for example, a building material in the form of a polymeric siding fabricated with the capstock 100 covering a polymeric substrate. Alternatively, the melted materials of the substrate 114 are supplied to the post forming section 614, by way of a schematically shown feed line 632, for covering by the exemplary capstock 100, such that the capstock 100 covers a substrate 114 and is formed by the post forming section 614 into an article of manufacture.

An exemplary capstock 100 according to the invention is manufactured with particles of a polymeric matrix 702 combined with polymeric streaker pellets 700, which pellets 700 are coated with particles 702 of matrix materials. Additional particles 702 of matrix materials can be added and mixed with the coated streaker pellets 700. The matrix 702 melts at a first vicat softening temperature to envelop the streaker pellets 700. The streaker pellets 700 melt at a higher vicat softening temperature. The streaker pellets 700 are melted while being enveloped by melted, non-opaque matrix 702, and further, are melt formed to produce the exemplary polymeric streaks 102, 104, 106 that are visible beneath and through the surface of the exemplary non-opaque matrix 108. Thereby, the invention provides a non-opaque exemplary capstock 100, and variations thereof, having the exemplary streaks 102, 104, 106, and variations thereof, visible in three dimensions in the exemplary non-opaque matrix 108, and variations thereof.

According to the invention, the melted streaker pellets 700 form exemplary polymeric streaks 102, 104, 106 in the exemplary matrix 108. The streaks 102, 104, 106 are produced by viscoelastic deformation of the melted polymeric streaker materials. Viscoelastic materials exhibit both viscous behavior and elastic behavior in response to an applied deformation, which occur, for example, by passage of a melt phase matrix 702 and melt phase streaker pellets 700 through the screw feed section 604 of the apparatus 600, and then through the extrusion die 610 of the apparatus 600.

In an embodiment of the invention, a non-opaque exemplary capstock 100, and variations thereof, incorporate exemplary streaks 102, 104, 106, and variations thereof, visible in three dimensions, to simulate wood grain or mineral veining in one or a plurality of capstock layers, each layer containing visible streaks, which further adds an aesthetic, three dimensional depth to the exemplary capstock 100 to provide a simulated synthetic slate, shake, panel or tile simulating marble stone, for example.

In another embodiment of the invention, a non-clear, non-opaque exemplary capstock 100, and variations thereof, are non-opaque to an extent that an underlying substrate 114, and variations thereof, is visible through the surface of the exemplary capstock 100, which provides an aesthetic three dimensional appearance.

According to another embodiment of the invention, the exemplary capstock 100, and variations thereof, are melt formed together with an underlying substrate 114, and variations thereof, in a corresponding extrusion die 610 that shapes both the exemplary capstock 100 and an underlying substrate 114, and variations thereof, simultaneously.

According to another embodiment of the present invention, less expensive polymers are used for making a non-opaque matrix 108 of an exemplary capstock 100, in place of optically clear polymers proposed for making a clear capstock. In place of costly, optically clear polymers, such as, polycarbonates and polyacrylates, the capstock matrix polymer comprises, a different chemical type, for example, one, or a mixture of, crystalline or semicrystalline polymers that are non-opaque to visible light when in a melt state, and retaining some degree of being non-opaque after solidification. Such crystalline or semicrystalline polymers are thermoplastics that are substantially non-opaque in a liquid phase, at and above the vicat softening point temperature (Tm) of the corresponding polymers. Accordingly, the crystalline polymers are melted in the screw feed section 604 of the apparatus 600 and are non-opaque in their melted states.

Crystalline or semicrystalline polymers become opaque in their solid states, due to crystalline phase formations, or crystallites, that form while the polymers cool down below the crystallization temperature (Tc) thereof. Crystallization occurs, during cool-down and within a temperature range that falls between the vicat softening point temperature (Tm) and the glass transition temperature (Tg). Light-scattering by the crystallites makes the crystalline polymers opaque in visible light.

The polymer glass transition temperature (Tg) is measured using a differential scanning calorimeter, commercially available, from Texas Instruments Inc. (model 2010). The procedure is well known to those skilled in the art. Polymer samples starting at ambient temperature are heated in a nitrogen or helium atmosphere at rising temperatures of 20° C./minute through the glass transition temperature recording mid point values.

According to the invention, in alternate embodiments a crystalline or semicrystalline polymer or a mixture of crystalline and/or semicrystalline polymers are selected for the matrix polymer of a capstock 100. After melt forming, for example, by extrusion followed by, compression molding or casting or molding in situ, the crystalline polymer is rapidly cooled, to transition rapidly in temperature at least to a temperature between the vicat softening point temperature (Tm) above the glass transition temperature (Tg), whereby, crystallite formation, if any, is minimized. Alternatively, such rapid cooling can include rapid cooling to a temperature below any glass transition temperature (Tg) and any crystallization temperature (Tc).

A non-opaque matrix for a capstock according to the invention is produced by the apparatus 600. A fluent, or flowable, crystalline or semicrystalline polymer material is conveyed by the screw feed section 604. The polymer is heated in the screw feed section 604 to at least its vicat softening point temperature (Tm) such that the polymer is rendered substantially non-opaque and in a melt phase. The melt phase polymer is impelled by the screw feed section 604 and injected under heat and pressure, through the extrusion die 610, wherein the polymer is heat formed into a non-opaque capstock extrudate 100. Further, rapid cooling in the cooling section 616 inhibits or minimizes the formation of crystallite sizes and crystallite sites, whereby the solidified polymer will remain stably non-opaque below its vicat softening point temperature (Tm). After extrusion and final forming of the capstock 100 and substrate 114, heat is rapidly removed from the polymeric material that passes proximate to the conduits 620 of the heat exchanger 618. In alternative embodiments heat is rapidly removed by the heat exchanger 618 or a cooling tower disclosed by Application number PCT/US07/85900.

Another suitable non-opaque polymeric capstock material comprises a mixture of two or more miscible thermoplastic polymers that are miscible and non-opaque in their melt phase. Such polymers combine or blend at elevated temperatures, either at or above their vicat softening point temperatures, to form a miscible single phase that is non-opaque. A miscible polymers mixture is distinguished from a multiphase polymers mixture in which two or more, immiscible phase polymers are present in separate and distinct polymeric regions in the mixture. When phase separation is present, and different indices of light refraction are present for the different phases present, light scattering can occur, which contributes to opaqueness. Rapid cooling minimizes or inhibits phase separation and the accompanying light scattering. When such polymers have different glass transition temperatures, the multiphase polymeric mixture will have more than one glass transition temperature. Similarly, when such polymers have different vicat softening point temperatures, the multiphase polymeric mixture will have more than one vicat softening point temperature.

During cool down of a melted, miscible single phase, some miscible polymers can undergo solid phase separation at their respective vicat softening point temperatures and/or respective glass transition temperatures. However, according to a feature of the present invention, rapid cooling of the melted, miscible single phase suspends such phase separation, and forms a solid phase, in which the non-opaque property is preserved.

The streaker pellets 700 are made from agglomerated particles of various constituent materials. The constituent particles adhere together to make the streaker pellets 700. The streaker pellets 700 have various sizes, which produce corresponding sizes of streaks in the matrix of the exemplary capstock 100. The various constituents of the streaker pellets 700 include one or more thermoplastics materials or thermoset materials.

The particles of the streaker pellets 700, as well as, the particles 702 of the matrix 102 comprise resinous thermoplastic materials. Polymerized thermoplastic materials can be remelted. A solidified thermoplastic can be ground to form meltable particles, which are graded according to various sizes by screen separation. The particles can adhere by being self-adherent. Alternatively, the particles can be mixed with pre-polymerized thermoplastic materials, some of which are fluid phase constituents that adhere together other constituents in particle form, to make the streaker pellets 700. Alternatively, the fluid phase constituents can be added to the other particle form constituents of the streaker pellets 700 before introduction to the apparatus 600. Alternatively, the fluid phase constituents can be added to the other particle form constituents of the streaker pellets 700 concurrently with the process step of adding the streaker pellets 700 to the hopper 602 of the apparatus 600. The constituent materials melt in the screw feed section 604, which alloys the constituent materials, which act as a unit within each corresponding pellet 700, to form a corresponding streak 102, 104, 106 in the exemplary capstock 100, and its variations.

Each of the streaker pellets 700 comprises, a polymeric composition having a higher vicat softening temperature than the polymeric matrix particles 702. When the streaker pellets 700 comprise a multiphase polymer, the multiphase polymer has more than one vicat softening point temperature, which are higher than that of the polymeric matrix material. Further, the streaker pellets 700 have a lower melt viscosity, corresponding to a higher melt flow index and a lower melt flow rate, than that of the matrix in melt phase. When the streaker pellets 700 comprise a multiphase polymer, the multiphase polymer has more than one melt flow index and more than one melt flow rate, both of which are higher than that of the matrix in melt phase.

The streaker pellets 700 can have polymeric constituents and other constituents, such as dyes, pigments, colorants and the like, that are not required to be non-opaque. Accordingly, a wide variety of polymeric constituents are available. Polymeric materials suited for melt forming processes, include, but are not limited to: polycarbonate, polysulphone, nylon, ethylene copolymers, polyethers, polyesters, polyether-polyester copolymers, acrylic polymers, polymethyl methacrylate, polyvinyl chloride, polyolefins, polypropylene copolymers, polyethylene imine, polyurethanes, polyether imide, polyketones, and the like, including photochemical reactive derivatives thereof. Polymers having a number average molecular weight of greater than 5,000 are preferred and polymers having a number average molecular weight of at least 20,000 are more preferred and polymers having a number average molecular weight of at least 50,000 are even more preferred. Polymers generally having a preferred number average molecular weight of at most 1,000,000 are preferred. Various polymeric constituents for the streaker pellets 700 will now be discussed.

For example, according to an embodiment of the invention, each of the streaker pellets 700 further comprises, a constituent polymeric composition having an index of refraction different than that of the exemplary, non-opaque matrix 108, such that, at least a portion of the streaker composition that is beneath the surface of the matrix 108 is visible by light refraction beneath the surface of the non-opaque matrix 108, at the interface of the streaker composition and the non-opaque matrix 108.

According to another embodiment of the invention, each of the streaker pellets 700 further comprises, in part, a constituent pigment. When the exemplary capstock 100 is coextruded together with an exemplary substrate 114, for example, a substrate of PVC and/or polypropylene, together they form a precursor adapted for compression molding as disclosed by US 2006/0029775 A1, or for casting or in situ molding, followed by rapid cooling to form an article, including, but not limited to; polymeric siding, roofing shingles, slates, shakes and panels, decking, floor coverings, tiles, fence posts and rails and window frames. The streaker pellets advantageously comprise, in part, a contrast color, a complementary color compared to the color of the substrate 114 of core material, or the same color as the substrate 114, compared to the color of the substrate. The capstock 100 and the exemplary substrate 114 are formed by coextrusion according to FIG. 6, without cooling by the heat exchanger 618, and instead, followed by compression molding as disclosed by US 2006/0029775 A1 or by casting or molding in situ, followed by rapid cooling to provide an article of manufacture.

According to an embodiment of the invention, bonding between the exemplary matrix 108 and the exemplary streaks 102, 104, 106 is assured when at least one of the constituents of the streaker pellets 700 is of the same chemical type as at least one of the polymers of the matrix 108.

In other embodiments of the invention, the composition of the streaker pellets 700 are selected for low materials cost, or for ease in processing, or for chemical compatibility with an underlying substrate 114 to be covered by the exemplary capstock 100.

Examples 1-3 described below produce a synthetic roofing shingle according to a process disclosed by US 2006/0029775 A1.

Example 1

Substrate core material pellets of a flexibilized polypropylene copolymer, 18S2A, available from Huntsman Chemical, Salt Lake City, Utah, were combined in a Werner Pfleiderer twin screw extruder with calcium carbonate, Hubercarb Q3, available from J. M. Huber Corporation, Atlanta, Ga., using gravimetric feeders to obtain a mixture that was 50 wt % polypropylene and 50 wt % calcium carbonate. This mixture was extruded as a strand and chopped into pellets of filled polypropylene for later processing.

Example 2

Capstock matrix pellets of a flexibilized semicrystalline polypropylene copolymer, 18S2A, available from Huntsman Chemical, Salt Lake City, Utah, were combined in a Werner Pfleiderer twin screw extruder with calcium carbonate, Hubercarb Q3, available from J. M. Huber Corporation, Atlanta, Ga., and a stabilizer package, FS-811, available from Ciba Specialty Chemicals, Tarrytown, N.Y., using gravimetric feeders to obtain a mixture that was 79.25 wt % polypropylene, 20 wt % calcium carbonate and 0.75% stabilizer package. This mixture was extruded as a strand and chopped into pellets of filled polypropylene PPC2F2 for later processing.

Example 3

Dried pellets of filled polypropylene from Example 1 were fed into a first single screw extruder, MPM 3.5 inch in diameter, 24:1 L/D, to provide core material. Separately, dried pellets of filled polypropylene PPC2F2 from Example 4, pellets of gray toner 60Z2274 and black accent color pellets 68B282, available from Penn Color, Doylestown, Pa., were fed using gravimetric feeders to obtain a ratio of 2 wt % gray toner, 1 wt % accent color pellet, and 97 wt % filled polypropylene into a second extruder, Prodex 2.5 inch in diameter 24:1 L/D, to provide capstock material. The output of both extruders was fed through an adapter block and a dual layer coextrusion block to a flex lip die and coextruded to produce a sheet having a core of material from the first extruder bonded with a coextruded capstock provided by the second extruder, with the layer of capstock covering the top surface of the layer of core material.

The temperatures in degrees Fahrenheit of the zones of the capstock extruder, the adapter, the coextrusion block and the die are noted in Table 1.

TABLE 1

| Barrel zone | | | | Adapter zone | | | Co-Ex | Die zone | | |
| --- | --- | --- | --- | --- | --- | --- | --- | --- | --- | --- |
| 1 | 2 | 3 | 4 | 1 | 2 | 3 | block | 1 | 2 | 3 |
| 320 | 330 | 330 | 330 | 370 | 375 | 375 | 375 | 375 | 375 | 375 |

The die was adjusted to produce an extrudate that was about 19 inches in width and having a profile with varying thickness across the sheet ranging from about 0.375 inches to 0.245 inches. The relative rates of extrusion from the two extruders for the capstock and the core layers were controlled such that the capstock thickness was about 10% of the total thickness of the composite sheet. The sheet was extruded onto a first conveyor belt having variable speed matched to the extrudate speed. The temperature of the sheet was about 380 F when exiting the die.

When a section of sheet 13 inches in length had been extruded, the sheet was cut from the die lip. While still hot, the section of 19"×13" sheet was carried to a second conveyor belt and transferred to and centered on the lower plate of a mold having a size of 18"×12". Infrared lamps were provided above the conveyor to maintain the temperature of the sheet during transfer. On reaching the lower mold plate, the surface temperature was about 300 F. The upper portion of the mold, having a surface texture designed to represent the surface texture of a natural slate, was brought into contact with the sheet on the lower plate and the mold was closed in a platen press with 20 tons pressure to shape and form the sheet, with a slight excess of material being squeezed out of the mold. The flow of material at the edges of the mold was such that the capstock thickness at the molded edges of the shape was maintained to be least 4 mils over the entire top surface of the piece, even at the edges where surface flow is most extreme.

Cooling was applied to the mold by means of water circulating cooling lines in the mold plates to cool the formed sheet to a solid state. After about 1 minute, the mold was opened to release a short cycle compression molded synthetic roofing tile having a core layer and a variegated capstock layer, the capstock having a base gray color with gray-black accent streaks.

Figure 8:
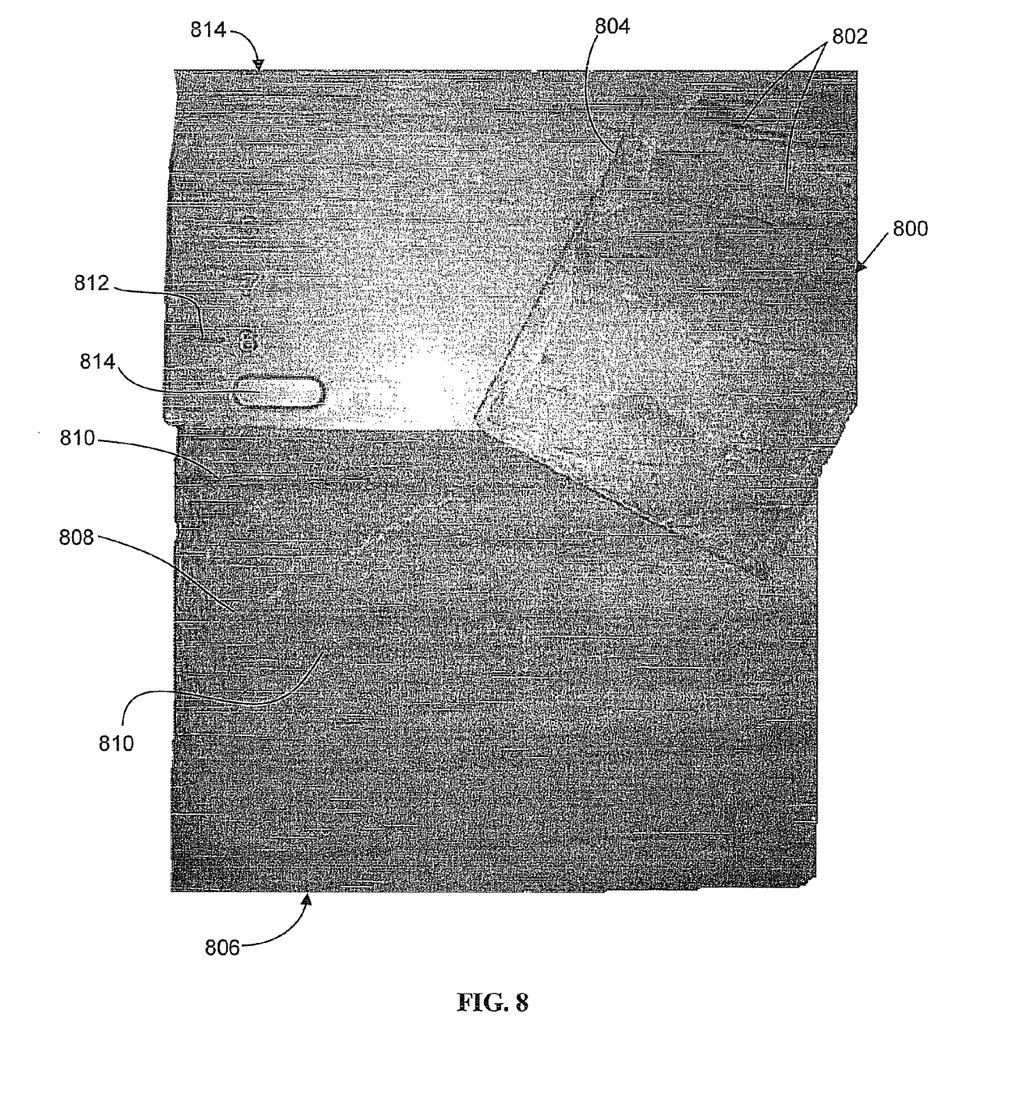
FIG. 8 is a reproduced photograph of a roofing shingle of natural slate compared to a synthetic roofing shingle simulating natural slate.

FIG. 8 is a reproduced photographic image of a roofing shingle of natural slate 800 exhibiting its natural coloration and mineral veining 802 appearing as different colors and/or complementary colors. The natural slate 800 has a naturally appearing, fragmented edge 804 revealing frangible layers in the thickness of the natural slate 800. In FIG. 8, the natural slate 800 is positioned for comparison with a synthetic roofing shingle 806. The synthetic roofing shingle 806 has a capstock 808 providing a surface area of simulated slate. The capstock 808 has a simulated slate coloration provided by the gray toner 60Z2274 in the matrix of the capstock 808. The capstock 808 has simulated mineral veining provided by extrusion of the accent color pellets 68B282 with the matrix to provide streaks 810. The thickness of the synthetic roofing shingle 806 is provided by a coextrusion of the capstock 808 with a substrate core material underlying the capstock 808. The shingle has a unitary headlap 814. The headlap 814 is a portion of the shingle 806 that is intended to be lapped and covered by a successive course of shingles 806 installed on a roof. The shingle 806 is installed on a roof by driving nails through a number of nail receiving areas or zones 812.

Example 4

According to an embodiment of the invention, a non-clear, non-opaque capstock 808 of FIG. 8 is manufactured by omitting the gray toner 60Z2274 of EXAMPLE 3 in the capstock matrix of EXAMPLE 2 for the capstock 808. The capstock composition is metered to include 1 wt. % of the accent color pellets and 99 wt. % of the capstock matrix of EXAMPLE 2. Further, the non-clear, non-opaque capstock 808 comprises a plurality of layers having respective streaks 810, by coextrusion of the layers in respective screw feed sections 604, 628 in FIG. 6. The gray toner 60Z2274 that simulates a slate coloration is omitted from the capstock 808 and, instead, is added to the substrate core material of EXAMPLE 1 for the substrate 812. Thereby the simulated coloration of the substrate core material is visible through the layers of the non-clear, non-opaque capstock 808.

Further, according to an embodiment of the invention the combined capstock precursor and substrate core material are cooled from a melt temperature at the compression mold of US 2006/0029775 A1 rapidly through and below a crystalline or semicrystalline melt temperature (Tc) to limit the formation of crystallites that would contribute to the opaqueness of the capstock composition. Thereby, the degree of opaqueness of the capstock composition is controlled to provide a non-opaque state sufficient for the underlying streaks and the core material to be viewed through the solidified capstock composition. The presence of calcium carbonate contributes to non-clarity, but is reduced to 20 wt. % to be insufficient to render the capstock composition opaque.

A shear rate of about 100 (l/s) is typical for a polymer undergoing flow in a sheet extrusion process. Table 2 indicates the viscosity of the streaker color pellets 68B282 is less than the viscosity of the capstock matrix of filled polypropylene PPC2F2 when sheet extruded at 290° C. and at a typical shear rate of about 100 (l/s). Thus, streak formation occurs when lower viscosity streaker color pellets 68B282 deform into successful streaks within the extruded capstock matrix of filled polypropylene PPC2F2. The viscosity of the grey toner 60Z2274 is provided in Table 2 to indicate low viscosity and thorough dispersion when the filled polypropylene substrate core of EXAMPLE 1 is coextruded with the capstock matrix of filled polypropylene PPC2F2 at 290° C. and at a typical shear rate of about 100 (l/s).

TABLE 2

RHEOGRAPH 6000 USING A 10:1 ROUND DIE AND 500 BAR PRESSURE TRANSDUCER
Viscosity in Pa-S

| Apparent Shear | 68B282 | | | PPC2F2 Temp (° C.) | | | 60Z2274 | | |
| --- | --- | --- | --- | --- | --- | --- | --- | --- | --- |
| Rate (1/s) | 290 | 300 | 310 | 290 | 300 | 310 | 290 | 300 | 310 |
| 100.2 | 640.16 | 475.55 | 487.74 | 749.90 | 695.03 | 357.54 | 103.64 | 121.93 | 134.13 |
| 146.9 | 561.26 | 394.96 | 428.22 | 557.10 | 503.05 | 300.56 | 70.68 | 108.09 | 83.15 |
| 215.4 | 550.08 | 368.61 | 402.64 | 430.99 | 368.61 | 233.71 | 65.22 | 76.56 | 70.89 |
| 316.2 | 517.63 | 314.83 | 357.32 | 332.21 | 280.06 | 184.12 | 56.01 | 61.81 | 56.01 |
| 462.3 | 481.31 | 276.18 | 323.53 | 257.77 | 219.63 | 145.21 | 47.35 | 51.29 | 44.72 |
| 681.3 | 430.24 | 247.39 | 286.83 | 197.19 | 172.99 | 111.14 | 37.65 | 38.54 | 32.27 |
| 1000.0 | 387.15 | 221.05 | 247.31 | 150.83 | 131.90 | 86.53 | 31.75 | 30.53 | 21.37 |
| 1467.8 | 331.98 | 191.37 | 201.77 | 118.57 | 104.00 | 67.45 | 26.63 | | 452.21 |
| 2154.6 | 113.94 | | | 90.70 | 80.49 | | | | 347.76 |

Table 2 records measurements made with a capillary rheometer, Gottfert Rheograph 6000 using a 10:1 round die and a 500 bar pressure transducer. Temperatures were 290, 300 and 310° C. Apparent viscosity is reported in Pascal·seconds, and apparent shear rates are reported in reciprocal seconds. The dataset includes viscosities for the color pellets 68B282 used in Examples 3 and 4 herein, the filled polypropylene PPC2F2 used in Examples 2, 3 and 4, herein, and the gray toner 60Z2274 used in Examples 3 and 4 herein.

While this invention has been described in detail and with reference to specific examples thereof, it will be apparent to one skilled in the art that various changes and modifications can be made therein without departing from the spirit and scope thereof.

Patents, patent applications and publications referred to herein are hereby incorporated herein in their entireties.

What is claimed is:

1. A variegated product, comprising:
a capstock having a matrix and polymeric streaks visible through the matrix;
the matrix comprises a polypropylene and calcium carbonate in an amount of 79.25 wt % polypropylene and 20 wt % calcium carbonate, the matrix further comprises a non-clear, non-opaque matrix in a plurality of layers, wherein the non-clear; and
the polymeric streaks are in the plurality of layers and are visible through the non-clear, non-opaque matrix, wherein the polymeric streaks include a second polypropylene and a second calcium carbonate in a weight ratio of 1:1.

2. The variegated product of claim 1 wherein the streaks have at least one characteristic selected from the group consisting of different sizes, shapes, widths, diameters, diffusive boundary definition and combinations thereof, and the plurality of layers comprises an intermediate layer with polymeric streaks of an intermediate length that is longer than the shortest polymeric streaks, and a bottom layer with the longest polymeric streaks that are longer than the intermediate length.

3. The variegated product of claim 2 wherein the polymeric streaks comprise streaks of different colors, and the streaks of different colors are in different layers of non-clear, non-opaque matrix, and the intermediate polymeric streaks are the lightest in color compared to colors of the polymeric streaks in other ones of the plurality of layers.

4. The variegated product of claim 1 wherein the polymeric streaks comprise streaks of different colors, and the shortest polymeric streaks are the widest compared to the polymeric streaks in other ones of the plurality of layers.

5. The variegated product of claim 1 wherein the non-clear, non-opaque matrix is formed by rapid cooling following an extruding of the capstock.

6. A variegated product, comprising:
a capstock covering a substrate;
the capstock having a matrix and polymeric streaks visible through the matrix;
the matrix comprises a polypropylene and calcium carbonate in an amount of 79.25 wt % polypropylene and 20 wt % calcium carbonate, the matrix further comprises a non-clear, non-opaque matrix in a plurality of layers, wherein the non-clear;
the polymeric streaks are in the plurality of layers and are visible through the non-clear, non-opaque matrix, wherein the polymeric streaks include a second polypropylene and a second calcium carbonate in a weight ratio of 1:1; and
the plurality of layers comprises a first layer with the shortest polymeric streaks compared to the polymeric streaks in other ones of the plurality of layers.

7. The variegated product of claim 1 or 6 wherein the capstock and matrix comprise a building material, the building material selected from the group consisting of polymeric siding, synthetic roofing shingles, slates, shakes and panels, decking, floor coverings, tiles, fence posts and rails and window frames.

8. The variegated product of claim 6 wherein the streaks have at least one characteristic selected from the group consisting of different sizes, shapes, widths, diameters, diffusive boundary definition and combinations thereof.

9. The variegated product of claim 6 wherein the polymeric streaks comprise streaks of different colors, and the shortest polymeric streaks in the first layer are the widest compared to widths of the polymeric streaks in other ones of the plurality of layers.

10. The variegated product of claim 6 wherein the polymeric streaks comprise streaks of different colors, and the streaks of different colors are in different layers of non-clear, non-opaque matrix, and the intermediate polymeric streaks are the lightest in color compared to colors of the polymeric streaks in other ones of the plurality of layers.

11. A variegated product comprising:
a building material selected from the group consisting of polymeric siding, synthetic roofing shingles, slates, shakes and panels, decking, floor coverings, tiles, fence posts and rails and window frames;
the building material including a capstock wherein the capstock comprises a matrix and polymeric streaks of different colors visible through the matrix;
the matrix comprises a polypropylene and calcium carbonate in an amount of 79.25 wt % polypropylene and 20 wt % calcium carbonate, the matrix further comprises a non-clear, non-opaque matrix in a plurality of layers wherein the polymeric streaks include a constituent polymeric composition having an index of refraction different than that of the non-clear, non-opaque matrix; and
the capstock comprises three coextruded layers including a top layer with the shortest polymeric streaks, an intermediate layer with polymeric streaks of an intermediate length that is longer than the shortest polymeric streaks, and a bottom layer with the longest polymeric streaks that are longer than the intermediate length.

12. The variegated product of claim 11 wherein the shortest polymeric streaks in the top layer are the widest compared to widths of the polymeric streaks in intermediate and bottom layers.

13. The variegated product of claim 11 wherein the intermediate polymeric streaks are the lightest in color compared to colors of the top and bottom layers.

* * * * *

UNITED STATES PATENT AND TRADEMARK OFFICE
CERTIFICATE OF CORRECTION

PATENT NO. : 9,452,560 B2
APPLICATION NO. : 12/521414
DATED : September 27, 2016
INVENTOR(S) : Husnu Kalkanoglu and Gregory F. Jacobs It is certified that error appears in the above-identified patent and that said Letters Patent is hereby corrected as shown below:

In the Claims

Column 17, Line 9, Claim 1 please delete ", wherein the non-clear".
Column 17, Line 45, Claim 6 please delete ", wherein the non-clear".

Signed and Sealed this
Twenty-fifth Day of September, 2018

Andrei Iancu
*Director of the United States Patent and Trademark Office*